US010018870B2

(12) United States Patent
Jiang et al.

(10) Patent No.: US 10,018,870 B2
(45) Date of Patent: Jul. 10, 2018

(54) CURVED DISPLAY PANEL, METHOD FOR FABRICATING THE SAME, CURVED DISPLAY DEVICE (71) Applicants: BOE TECHNOLOGY GROUP CO., LTD., Beijing (CN); HEFEI XINSHENG OPTOELECTRONICS TECHNOLOGY CO., LTD., Anhui (CN)

(72) Inventors: Liangliang Jiang, Beijing (CN); Lei Guo, Beijing (CN); Yongjun Yoon, Beijing (CN)

(73) Assignees: BOE TECHNOLOGY GROUP CO., LTD., Beijing (CN); HEFEI XINSHENG OPTOELECTRONICS TECHNOLOGY CO., LTD., Anhui (CN)

( * ) Notice: Subject to any disclaimer, the term of this patent is extended or adjusted under 35 U.S.C. 154(b) by 0 days.

(21) Appl. No.: 15/540,352

(22) PCT Filed: Oct. 19, 2016

(86) PCT No.: PCT/CN2016/102547
§ 371 (c)(1),
(2) Date: Jun. 28, 2017

(87) PCT Pub. No.: WO2017/067453
PCT Pub. Date: Apr. 27, 2017

(65) Prior Publication Data
US 2017/0351139 A1 Dec. 7, 2017

(30) Foreign Application Priority Data
Oct. 21, 2015 (CN) .......................... 2015 1 0689261

(51) Int. Cl.
*G02F 1/1335* (2006.01)
*G02F 1/1333* (2006.01)
*G02F 1/1343* (2006.01)

(52) U.S. Cl.
CPC ...... *G02F 1/133512* (2013.01); *G02F 1/1343* (2013.01); *G02F 1/133345* (2013.01);
(Continued)

(58) Field of Classification Search
CPC .... G02F 1/133512–1/133514; G02F 1/133305
See application file for complete search history.

(56) References Cited

U.S. PATENT DOCUMENTS

2009/0161048 A1* 6/2009 Satake .............. G02F 1/133305
349/110
2009/0316062 A1 12/2009 Nishizawa
(Continued)

FOREIGN PATENT DOCUMENTS

CN 102778779 A 11/2012
CN 104049399 A 9/2014
(Continued)

OTHER PUBLICATIONS

First Office Action for Chinese Patent Application No. 201510689261.3 dated Aug. 28, 2017.
(Continued)

*Primary Examiner* — Mariceli Santiago
(74) *Attorney, Agent, or Firm* — Calfee, Halter & Griswold LLP (57) ABSTRACT A curved display panel, a method for fabricating the same, and a curved display device are disclosed. The curved display panel includes a first substrate, an oppositely arranged second substrate, and a liquid crystal layer between the first and second substrates. The first substrate is an array substrate, and includes a first light shielding layer in a light (Continued)

non-transmission region. The second substrate comprises color resists of at least three different colors, and the second substrate is arranged closer to a back light source than the first substrate. After assembling, the first and second substrates have an arc-shaped cross section in an extending direction of a side of the second substrate, the arc-shaped cross section has a bending direction opposite to an incident direction of light from the back light source, and the first and second substrates have a same bending direction.

16 Claims, 9 Drawing Sheets

(52) U.S. Cl.
CPC .................. *G02F 1/133514* (2013.01); *G02F 2001/133354* (2013.01)

(56) References Cited

U.S. PATENT DOCUMENTS

| | | | | |
|---|---|---|---|---|
| 2011/0255039 A1* | 10/2011 | Enomoto | .......... | G02F 1/133305 349/113 |
| 2014/0176856 A1* | 6/2014 | Lee | ................... | G02F 1/133305 349/61 |
| 2016/0139457 A1 | 5/2016 | Wu | | |
| 2016/0195761 A1 | 7/2016 | Liu et al. | | |
| 2017/0102590 A1 | 4/2017 | Wang et al. | | |
| 2017/0285392 A1* | 10/2017 | Hirata | ............... | G02F 1/133308 |
| 2017/0351148 A1* | 12/2017 | Yoshida | ............ | G02F 1/133753 |

FOREIGN PATENT DOCUMENTS

| | | | |
|---|---|---|---|
| CN | 104155809 A | 11/2014 | |
| CN | 104407460 A | 3/2015 | |
| CN | 104460124 A | 3/2015 | |
| CN | 104765200 A | 7/2015 | |
| CN | 105158966 A | 12/2015 | |
| JP | 2009229667 A * | 10/2009 | ............. G09F 9/301 |
| KR | 101519987 B1 | 5/2015 | |

OTHER PUBLICATIONS

Search Report from International Application No. PCT/2016/102547 dated Dec. 28, 2016.
Second Office Action for Chinese Patent Application No. 201510689261.3 dated Jan. 12, 2018.

* cited by examiner

CURVED DISPLAY PANEL, METHOD FOR FABRICATING THE SAME, CURVED DISPLAY DEVICE

RELATED APPLICATIONS

The present application is the U.S. national phase entry of PCT/CN2016/102547, with an international filing date of Oct. 19, 2016, which claims the benefit of Chinese Patent Application 201510689261.3, filed on Oct. 21, 2015, the entire disclosures of which are incorporated herein by reference.

TECHNICAL FIELD

The present disclosure relates to the field of display technology, and particularly to a curved display panel, a method for fabricating the same, and a curved display device.

BACKGROUND

Currently in the field of a curved liquid crystal display panel, the liquid crystal display panel is generally adhered in a flat form, and then bent by an external force. The liquid crystal display panel is bent to a degree which is determined by a design size and a viewing distance, so as to form a curved structure. In case a color film substrate and an array substrate are adhered in the flat form under vacuum, a black matrix (BM) on the color film substrate play a roles of preventing color resists of different colors from color mixing and inhibiting light leakage. The existing curved liquid crystal display panel suffers from serious problems of light leakage and color mixing.

SUMMARY

Embodiments of the present disclosure provide a curved display panel, a method for fabricating the same, and a curved display device, which alleviate or eliminate one or more the above mentioned problems.

In an embodiment of the present disclosure, it is provided a curved display panel, comprising a first substrate and a second substrate which are arranged oppositely, and a liquid crystal layer which is arranged between the first substrate and the second substrate, wherein the first substrate is an array substrate, the first substrate is divided into a light transmission region and a light non-transmission region, and the first substrate comprises a first light shielding layer which is arranged in the light non-transmission region; wherein the second substrate comprises color resists of at least three different colors, and the second substrate is arranged closer to a back light source than the first substrate; and wherein the first substrate and the second substrate in an assembled state have an arc-shaped cross section in an extending direction of a side of the second substrate, the arc-shaped cross section has a bending direction opposite to an incident direction of light from the back light source, and the first substrate and the second substrate have a same bending direction.

In some embodiments, the first light shielding layer is made from a black matrix, and is arranged on a surface of the first substrate facing the second substrate.

In some embodiments, the light shielding layer comprises an opaque material of an organic resin or a metal.

In some embodiments, the light shielding layer is a Cu layer or Mo/Al/Mo stack.

In some embodiments, the first substrate further comprises a second light shielding layer which is arranged in the light non-transmission region, and which is further from the second substrate than the first light shielding layer.

In some embodiments, the second light shielding layer is made from an opaque material of the first substrate.

In some embodiments, the second light shielding layer is arranged in a same layer as a common electrode or is formed from a common electrode.

In some embodiments, the first substrate comprises a first base plate, as well as the common electrode, a gate, a first insulating layer, a semiconductor active layer, a source, a drain, a second insulating layer, a pixel electrode, and the first light shielding layer which are arranged on the first base plate in this order.

In some embodiments, the curved display panel further comprises photo spacers (PS) which are arranged between the first substrate and the second substrate, wherein orthographic projections of the photo spacers on the first substrate lie in the light non-transmission region.

An embodiment of the present disclosure further provides a curved display device, which comprises the above mentioned curved display panel, and a curved back light source, wherein the second substrate is closer to the curved back light source than the first substrate.

An embodiment of the present disclosure further provides a method for fabricating a curved display panel, comprising:

forming a first light shielding layer on a first base plate by a patterning process, wherein the first base plate is divided into a light transmission region and a light non-transmission region, and the first light shielding layer is formed in the light non-transmission region;

forming color resists of at least three different colors on a second base plate by a patterning process;

assembling the first base plate and the second base plate, and injecting liquid crystal layer between the first base plate and the second base plate; and bending the first base plate and the second base plate in a direction from the second base plate to the first base plate (towards the first base plate).

In some embodiments, the first light shielding layer is made from a black matrix, and is arranged on a surface of the first substrate facing the second substrate.

In some embodiments, forming the first light shielding layer on the first base plate by the patterning process comprises:

depositing an opaque organic resin layer on the first base plate; and performing exposing and developing on the opaque organic resin to form the first light shielding layer in the light non-transmission region of the first base plate.

In some embodiments, forming the first light shielding layer on the first base plate by the patterning process comprises:

depositing a metal layer on the first base plate;

coating photoresist on the metal layer, and performing exposing and developing on the photoresist, to only retain the photoresist in the light non-transmission region; and removing the metal layer in a region where the metal layer is not covered by the photoresist by etching, and remove the remaining photoresist to form the first light shielding layer.

In some embodiments, the method further comprises forming a second light shielding layer in the light non-transmission region of the first base plate, wherein the second light shielding layer is arranged further from the second substrate than the first light shielding layer.

In some embodiments, prior to forming the first light shielding layer on the first base plate by the patterning process, the method comprises:

forming a gate and a common electrode in the light non-transmission region of the first base plate by a first patterning process, wherein the common electrode is opaque to form the second light shielding layer;

forming a first insulating layer on the first base plate resulting from the previous step;

forming a semiconductor active layer, a source, and a drain on the first base plate resulting from the previous step by a second patterning process;

forming a second insulating layer on the first base plate resulting from the previous step by a third patterning process; and forming a pixel electrode on the first base plate resulting from the previous step by a fourth patterning process.

In some embodiments, after forming color resists of at least three different colors on the second base plate by the patterning process, the method comprises:

forming a planarization layer on the second base plate on which color resists of at least three different colors have been formed; and forming a plurality of photo spacers on the second base plate resulting from the previous step by a patterning process, wherein the photo spacers are arranged between the first base plate and the second base plate, and orthographic projections of the photo spacers on the first base plate lie in the light non-transmission region.

DETAILED DESCRIPTION OF EMBODIMENTS

The present disclosure embodiment provides a curved display panel and method for fabricating the same, curved display device, which improves light leakage and color mixing in a curved display panel.

Specific embodiments of the present disclosure will be further described hereinafter with reference to the drawings and embodiments. The following embodiments are only used for explaining more clearly the technical solution of the present disclosure rather than limiting the protection scope of the present disclosure.

The shapes and sizes of components in the drawings are not drawn in a true scale, and only intend to illustrate the content of the present disclosure.

Figure 1:
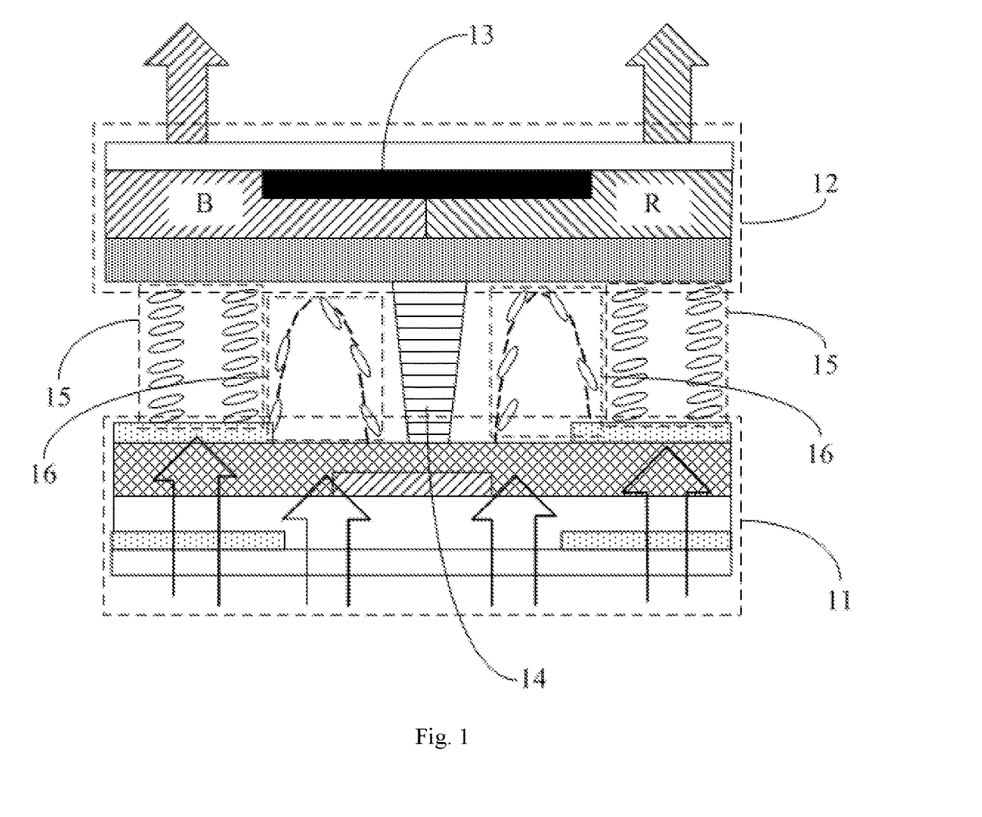
FIG. 1 is a cross sectional view for illustrating a planar display panel.

In a normal display region inside a pixel, liquid crystal molecules operate under the effect of a pixel voltage and a common voltage. In contrast, in a region near data lines, liquid crystal molecules are further affected by an electric field from data lines, and in a disordered state. It is required for the BM on the color film substrate to shield this region, so as to prevent light leakage. As shown in FIG. 1, some liquid crystal molecules between an array substrate 11 and a color film substrate 12 are located in a normal display region 15, and the remaining liquid crystal molecules are located in a disordered region 16. The disordered region 16 is shielded by a black matrix 13 on the color film substrate 12, so as to prevent light leakage. Photo spacers 14 are further arranged between the array substrate 11 and the color film substrate 12. Arrows in the figure indicate the propagation direction of light.

Figure 2A:
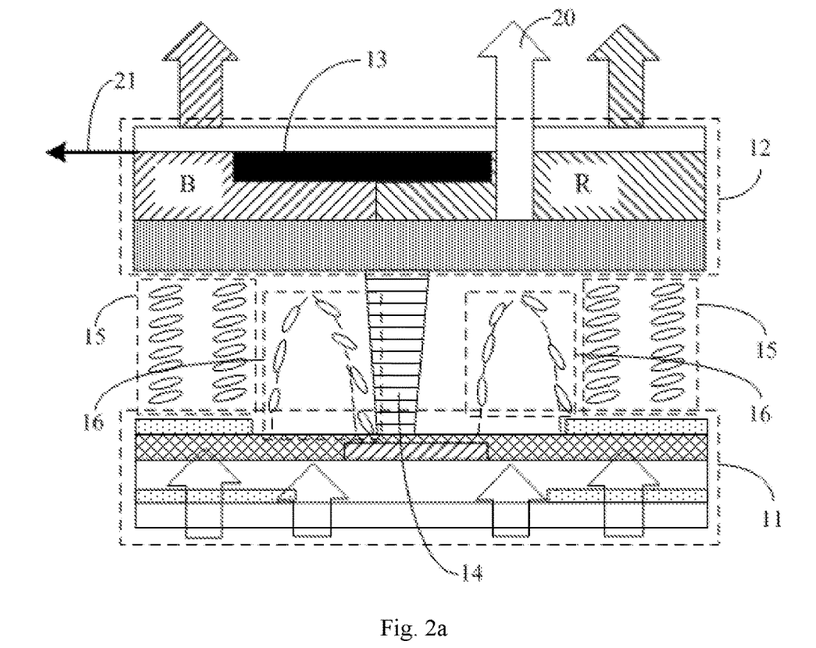
FIGS. 2a and 2b are schematic views for illustrating light leakage and color mixing after a color film substrate is displaced, respectively.
Figure 2B:
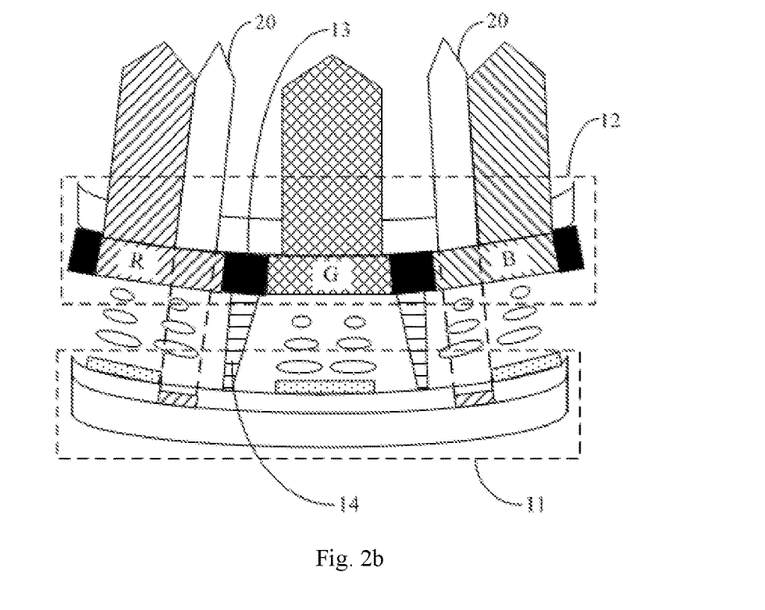

After molding, the liquid crystal display panel is bent by an external force into a curved surface. The BM on the color film substrate displaces dramatically with respect to positions which need to be shielded on the array substrate, so that the BM can no longer shield some disordered regions. The liquid crystal display panel is subject to very serious light leakage and color mixing, as shown in FIGS. 2a and 2b. In FIG. 2a, an arrow 21 indicates a drifting direction of a color film substrate which comprises one blue (B) color resist and one red (R) color resist. It can be seen that, at this time, the black matrix 13 between the B color resist and the R color resist can not completely shield the disordered region 16 at a right side of the figure. In the disordered region 16 at the right side, the liquid crystal display panel is subject to light leakage, as shown by an arrow 20 in the figure. It can also be seen from FIG. 2b that the liquid crystal display panel is subject to light leakage, as shown by the arrow 20.

In the existing curved liquid crystal display panel, the primary cause for serious light leakage and color mixing lies in that the BM for shielding is located on the color film substrate, the position of BM with respect to the light leakage region on the array substrate can be be fixed, and the BM displaces and drifts in relatively large space. In particular, the color film substrate and the array substrate displace and drift to a certain extent during adhering under vacuum. When the color film substrate and the array substrate are bent by an external force after molding, the color film substrate and the array substrate are subject to increased relative displacement and drifting, which leads to light leakage and color mixing in the curved liquid crystal display panel.

In order to overcome the above mentioned defects, for example the following method is adopted to improve light leakage and color mixing in the curved liquid crystal display panel.

Figure 3A:
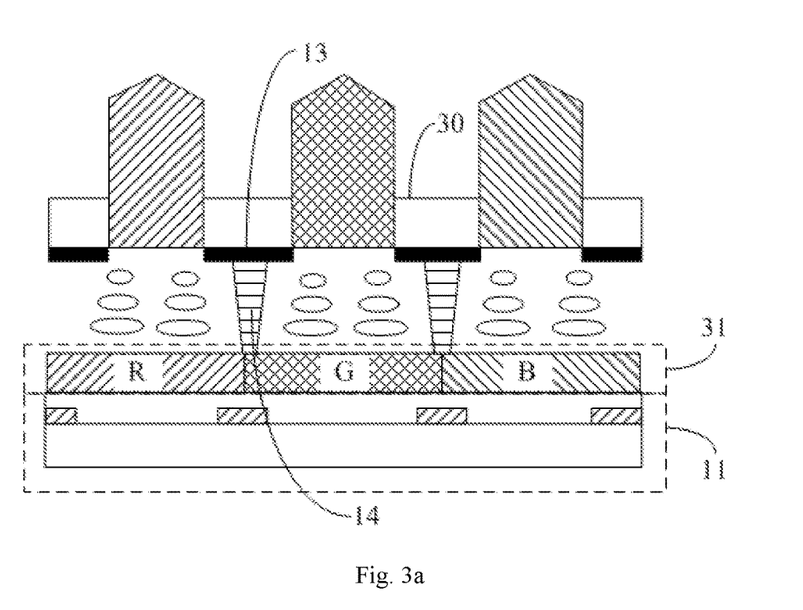
FIGS. 3a and 3b are cross sectional views for illustrating a planar display panel and a curved display panel, respectively.
Figure 3B:
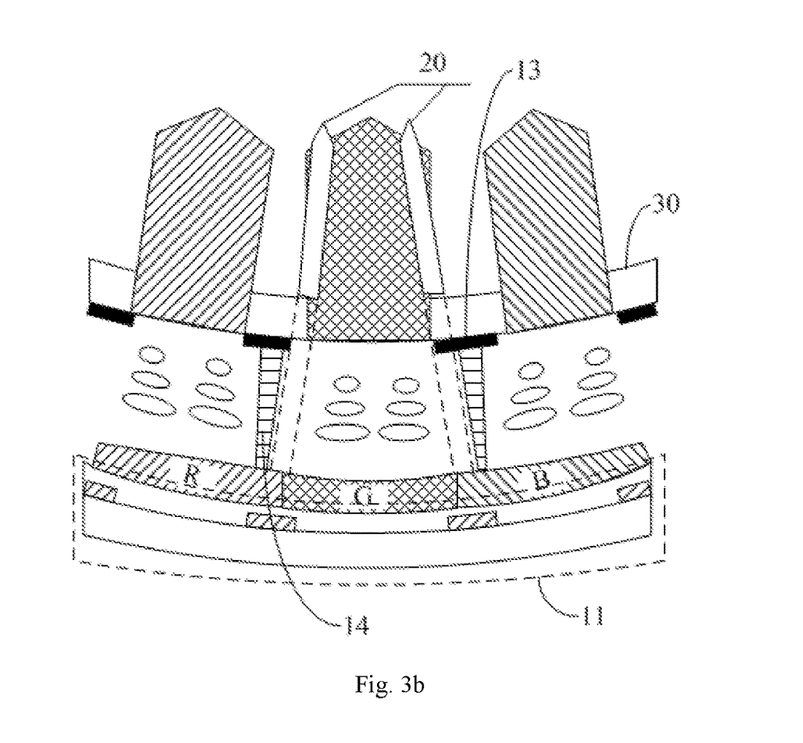

In a method, the color filter on array (COA) technique is adopted, in which the color film is formed on a side of the array substrate. As shown in FIGS. 3a and 3b, a color film 31 is formed on the array substrate 11. With this method, the black matrix 13 and the photo spacers 14 are formed on a base plate 30 which is arranged oppositely to the array substrate 11. FIG. 3a shows the resulting planar liquid crystal display panel. FIG. 3b shows a curved liquid crystal display panel which is formed by bending the planar liquid crystal display panel of FIG. 3a with an external force. As shown in FIG. 3b, this method improves color mixing, but light leakage still exists. The arrow 20 indicates the propagation direction of leaked light in case of light leakage.

Figure 4A:
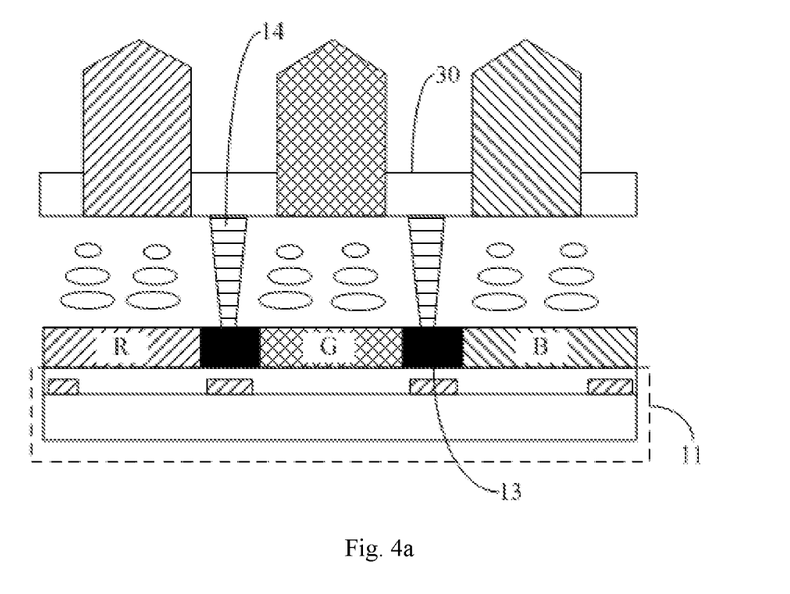
FIGS. 4a and 4b are cross sectional views for illustrating another planar display panel and a curved display panel, respectively.
Figure 4B:
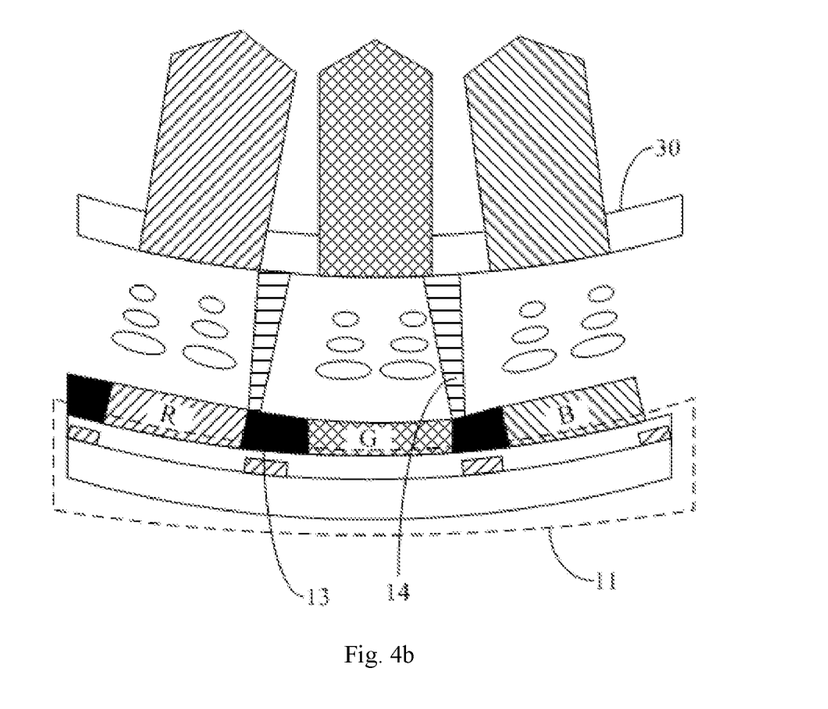

In another method, the COA and black matrix on array (BOA) technique is adopted, in which both the color film and the black matrix are formed on a side of the array substrate. As shown in FIGS. 4a and 4b, the photo spacers 14 are formed on the base plate 30 which is arranged oppositely to the array substrate. FIG. 4a shows the resulting planar liquid crystal display panel. FIG. 4b shows a curved liquid crystal display panel which is formed by bending the planar liquid crystal display panel of FIG. 4a with an external force. As shown in FIG. 4b, in the curved liquid crystal display panel formed by this method, both color mixing and light leakage are improved significantly. However, in this method, most processes are focused on the array substrate. As a result, the process flow is complicated and difficult with a low yield, this poses a great challenge to the current production capacity, and the production capacity and yield would not be realized sufficiently.

Figure 5A:
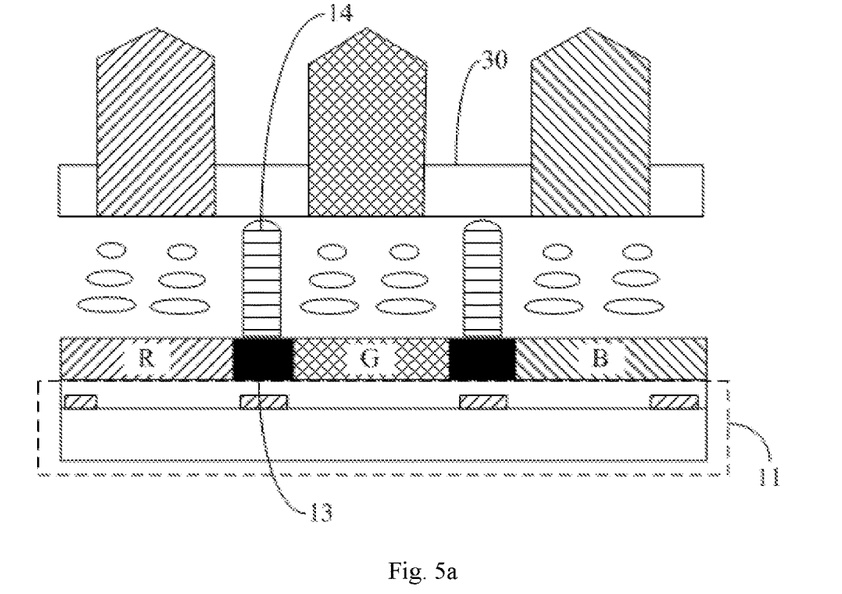
FIGS. 5a and 5b are cross sectional views for illustrating yet another planar display panel and a curved display panel, respectively.
Figure 5B:
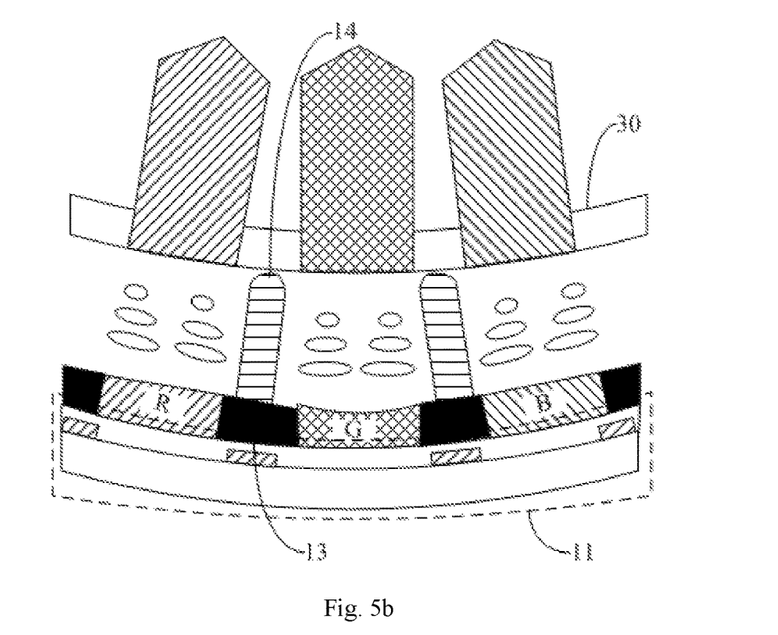

In yet another method, the COA and black matrix photospacers (BPS) technique is adopted, in which the color film, the black matrix, and the photo spacers are formed on a side of the array substrate. BM and PS are formed from a same material simultaneously by a gray tone mask. All processes are performed on the array substrate. The array substrate which is arranged oppositely to the base plate 30 only serves as an assembling cover plate, as shown in FIGS. 5a and 5b. FIG. 5a shows the resulting planar liquid crystal display panel. FIG. 5b shows a curved liquid crystal display panel which is formed by bending the planar liquid crystal display panel of FIG. 5a with an external force. As shown in FIG. 5b, in the curved liquid crystal display panel formed by this method, both color mixing and light leakage are improved significantly. However, in this method, most processes are still performed on the array substrate. As a result, the process flow is complicated and difficult with a low yield, this poses a great challenge to the current production capacity, and the production capacity and yield would not be realized sufficiently.

In term of improving light leakage and color mixing in the curved liquid crystal display panel, the methods as described above suffer from the following problems. The process flow is complicated and difficult with a low yield, this poses a great challenge to the current production capacity, and the production capacity and yield would not be realized sufficiently. To this end, embodiments of the present disclosure provide a novel curved display panel, which realizes curved display and alleviates or eliminates one or more the above mentioned problems. For example, the curved display panel effectively inhibits color mixing and light leakage in the curved liquid crystal display panel, and overcomes the defects of the above mentioned method in which the process flow is complicated and difficult with a low yield due to the fact that most processes are focused on the array substrate.

The curved display panel in specific embodiments of the present disclosure will be described hereinafter with reference to the accompanying drawings.

Figure 6:
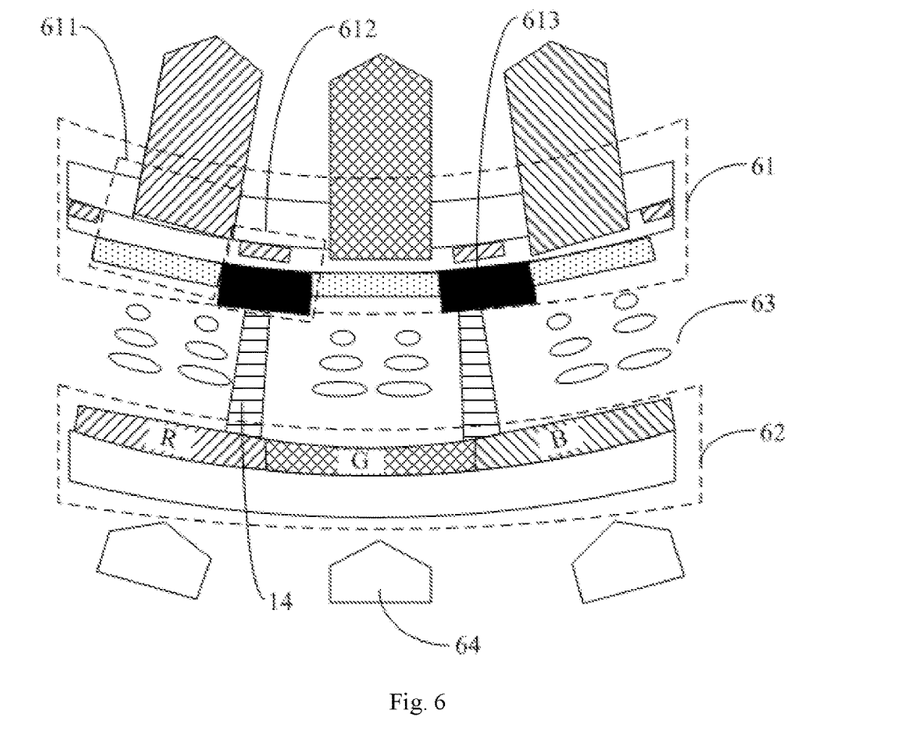
FIG. 6 is a cross sectional view for illustrating a curved display panel in an embodiment of the present disclosure.

As shown in FIG. 6, a specific embodiment of the present disclosure provides a curved display panel, comprising a first substrate 61 and a second substrate 62 which are arranged oppositely, and a liquid crystal layer 63 which is arranged between the first substrate 61 and the second substrate 62. The first substrate 61 is divided into a light transmission region 611 and a light non-transmission region 612. A first light shielding layer 613 is arranged in the light non-transmission region 612. The second substrate 62 comprises color resists of at least three different colors. As compared with the first substrate 61, in an incident direction of light 64 from the back light source, the second substrate 62 is closer to the back light source. In the specific embodiment of the present disclosure, reference is made to case in which the second substrate 62 comprises three color resists of red (R), green (G) and blue (B).

The first substrate 61 and the second substrate 62 are assembled, and have an arc-shaped cross section in an extending direction of a side of the second substrate 62. The arc-shaped cross section has a bending direction which is far from the incident direction of light 64. The first substrate 61 and the second substrate 62 have a same bending direction. The second substrate 62 generally comprises a first side and a second side which are perpendicular with each other. In some embodiments, the first substrate 61 and the second substrate 62 in the assembled state are bent in the extending direction of the first side, so as to form the curved display panel. In some embodiments, the first substrate 61 and the second substrate 62 in the assembled state in the extending direction of the second side, so as to form the curved display panel. In case the first side is longer than the second side, the first substrate 61 and the second substrate 62 in the assembled state are generally bent in the extending direction of the first side.

In a specific embodiment of the present disclosure, the curved display panel further comprises photo spacers 14 which are arranged between the first substrate 61 and the second substrate 62. Orthographic projections of the photo spacers 14 on the first substrate 61 are located in the light non-transmission region 612. Orthographic projections of the photo spacers on the first substrate refer to the photo spacers' projections in a direction perpendicular to the first substrate, at positions on the first substrate to which the photo spacers correspond.

In an exemplary embodiment, the first light shielding layer 613 is made from a black matrix, and is arranged on a surface of the first substrate 61 facing the second substrate 62. For example, the first light shielding layer 613 is made from an opaque organic resin or a metallic material. In case the first light shielding layer 613 is made from an opaque organic resin, an organic resin comprising chrome (Cr) is generally adopted. In case the first light shielding layer 613 is made from a metallic material, copper (Cu) or a molybdenum/aluminum/molybdenum (Mo/Al/Mo) stacked layer is adopted as the metallic material. An opaque metal also has the function of shielding light.

As shown in FIG. 6, the first substrate 61 is the array substrate, and the second substrate 62 is the color film substrate. The first light shielding layer 613 is arranged on a surface of the first substrate 61 facing the second substrate 62, so that is further from the back light source and is closer to eyes of a viewer. In this way, in case the first substrate 61 and the second substrate 62 are bent towards the first substrate 61 to form the curved display panel, the first light shielding layer 613 and the disordered region do not displace relatively, so as to improve light leakage. Besides, as compared with the case shown in FIGS. 3a and 3b, the first substrate 61 is the array substrate. Therefore, it is avoided that most processes are focused on the second substrate 62, which overcomes the defects in which the process flow is complicated and difficult with a low yield.

In an exemplary embodiment, the first substrate 61 further comprises a second light shielding layer which is arranged in the light non-transmission region 612, as shown by a shadow region in the light non-transmission region 612 of FIG. 6. The second light shielding layer is further from the second substrate 62 than the first light shielding layer 613. For example, the second light shielding layer is made from the opaque material in the first substrate 61. As described below, the second light shielding layer is arranged in a same layer as a common electrode in the first substrate 61. Alternatively, the second light shielding layer is formed from the common electrode form. Since the second light shielding layer is arranged in the light non-transmission region of the first substrate and is further from the second substrate, in case the first substrate and the second substrate are bent towards the first substrate to form the curved display panel, the second light shielding layer also has the shielding function. This avoids light leakage when there is relative displacement between the first light shielding layer and the disordered region, and improves light leakage.

As shown in FIG. 6, in a specific embodiment of the curved display panel, the first light shielding layer with a shielding function is formed in the corresponding disordered region on the first substrate 61, from an opaque organic resin or metal. Conventional R, G, B color resists are formed on the second substrate 62 for color filtering. In a specific embodiment, the curved display panel is bent towards the first substrate 61 to form a concave structure as shown in the figure. Light 64 from the curved back light source firstly passes through R, G, B color resist layers, and light of three primary colors R, G, B is formed. The light then passes through the liquid crystal layer 63, and is subject to gray tone regulation. Finally the light passes through the first substrate 61, and forms a picture to be viewed by the user.

Figure 7:
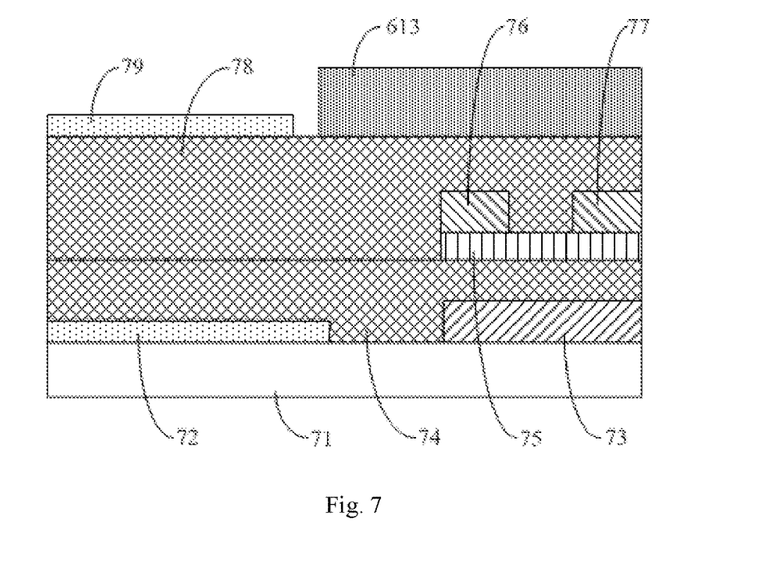
FIG. 7 is a cross sectional view for illustrating a first substrate of a curved display panel in an embodiment of the present disclosure.

In particular, as shown in FIG. 7, in a specific embodiment of the present disclosure, the first substrate 61 comprises a first base plate 71, as well as a common electrode 72, a gate 73, a first insulating layer 74, a semiconductor active layer 75, a source 76, a drain 77, a second insulating layer 78, a pixel electrode 79, and the first light shielding layer 613 which are arranged on the first base plate 71. Films in the first substrate 61 are formed by a method as described below.

A specific embodiment of the present disclosure further provides a curved display device, which comprise the above mentioned curved display panel, and a curved back light source. The curved back light source is arranged on a surface of the second substrate which is opposite to the first substrate. The curved display device can be a display device, such as a liquid crystal panel, a liquid crystal display, a liquid crystal TV, an organic light emitting diode (OLED) panel, an OLED display, an OLED TV, electronic paper.

Figure 8:
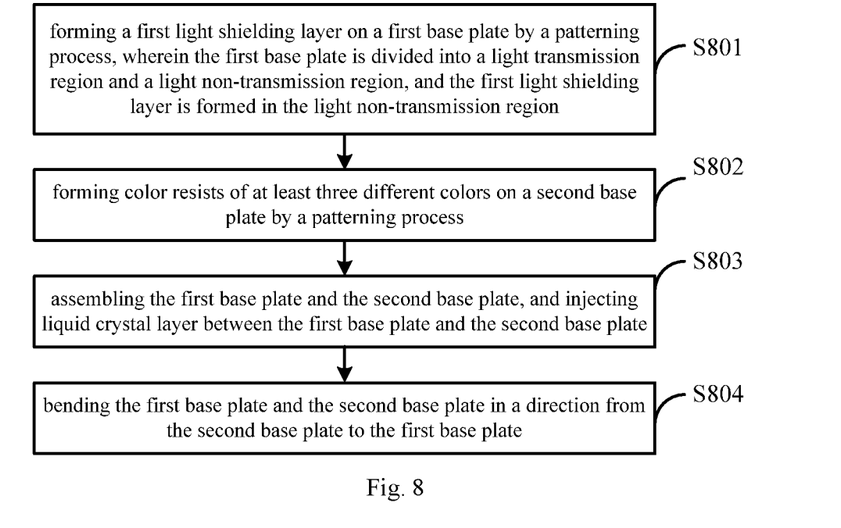
FIG. 8 is a flow chart for illustrating a method for fabricating a curved display panel in an embodiment of the present disclosure.

As shown in FIG. 8, a specific embodiment of the present disclosure further provides a method for fabricating a curved display panel. The method comprises:

S801, forming a first light shielding layer on a first base plate by a patterning process, wherein the first base plate is divided into a light transmission region and a light non-transmission region, and the first light shielding layer is formed in the light non-transmission region;

S802, forming color resists of at least three different colors on a second base plate by a patterning process;

S803, assembling the first base plate and the second base plate, and injecting liquid crystal layer between the first base plate and the second base plate; and S804, bending the first base plate and the second base plate in a direction from the second base plate to the first base plate.

Figure 9:
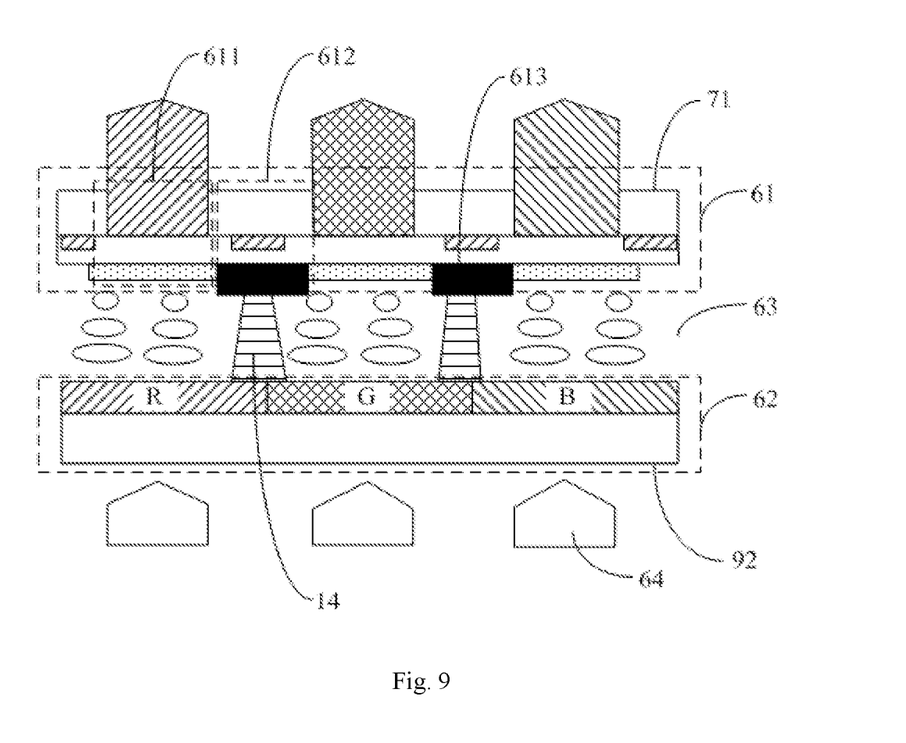
FIG. 9 is a cross sectional view for illustrating a curved display panel prior to being bent in an embodiment of the present disclosure.

As shown in FIG. 9, the first light shielding layer 613 is formed on the first base plate 71 by a patterning process. In the specific embodiment, the patterning process comprises some or all of photoresist coating, exposing, developing, etching, photoresist removing. In the specific embodiment, the first base plate 71 is divided into the light transmission region 611 and the light non-transmission region 612, and the first light shielding layer 613 is formed in the light non-transmission region 612.

As shown in FIG. 9, color resists of at least three different colors are formed on a second base plate 92 by a patterning process. In the specific embodiment, color resists of three different colors R, G, B are formed on the second base plate 92.

Then, the first base plate 71 on which the first light shielding layer has been formed and the second base plate 92 on which color resists of different colors have been formed are assembled, and the liquid crystal layer 63 is injected between the first base plate 71 and the second base plate 92. In the specific embodiment, the assembling process and the liquid crystal layer injection process are identical to the existing processes, which are not repeated here for simplicity.

Finally, the first base plate 71 and the second base plate 92 are bent towards the first base plate 71 to form the curved display panel shown in FIG. 6. The first light shielding layer is formed in the light non-transmission region of the first substrate 61, and the partial region corresponds to the disordered region of the display panel. When the assembled planar display panel is bent, there is no relative displacement between the first light shielding layer and the disordered region, which improves light leakage. In addition, light 64 from the back light source irradiates from the second substrate 62 and forms light of three primary colors R, G, B. When the light passes through the first substrate 61, the first light shielding layer 613 inhibits color mixing at the periphery of R, G, B pixels.

The process on the first base plate and the process on the second base plate will be described hereinafter with reference to specific embodiments.

The process on the first base plate in a specific embodiment of the present disclosure is described below.

Figure 10A:
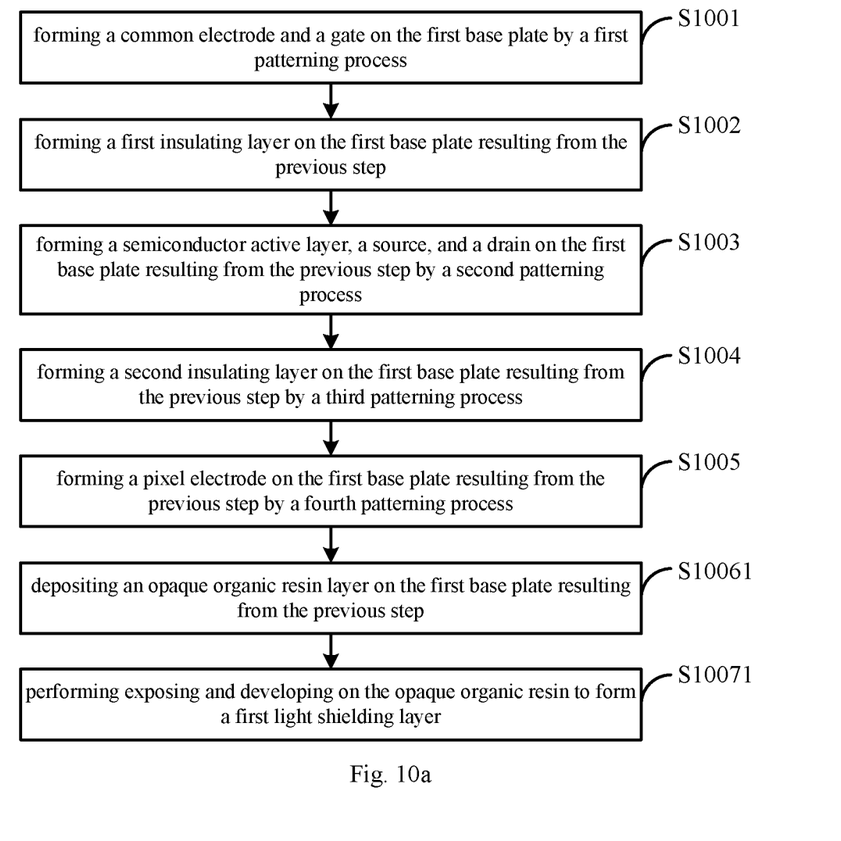
FIGS. 10a and 10b are flow charts for illustrating a method for forming a first substrate in specific embodiments of the present disclosure.

In an embodiment of the present disclosure, as shown in FIG. 10a, the process on the first base plate comprises:

S1001, forming a common electrode and a gate on the first base plate by a first patterning process;

S1002, forming a first insulating layer on the first base plate resulting from the previous step;

S1003, forming a semiconductor active layer, a source, and a drain on the first base plate resulting from the previous step by a second patterning process;

S1004, forming a second insulating layer on the first base plate resulting from the previous step by a third patterning process;

S1005, forming a pixel electrode on the first base plate resulting from the previous step by a fourth patterning process;

S10061, depositing an opaque organic resin layer on the first base plate resulting from the previous step; and S10071, performing exposing and developing on the opaque organic resin to form a first light shielding layer.

Firstly, the process forming the common electrode and the gate on the first base plate by the first patterning process in the present embodiment is identical to the existing process. In particular, an indium tin oxide (ITO) film and a copper (Cu) film are deposited in this order on the first base plate by sputtering. In practical production, in order to increase adhesion between the Cu film and a neighboring film, the Cu film is deposited in three times, and an element neodymium (Nd) is added to the Cu film which is deposit in the first time and the Cu film which is deposit in the third time. The deposited ITO has a thickness of 500 angstrom (Å). The Cu films deposited in three times have a thickness of 1000 Å, 3000 Å and 1000 Å. Photoresist is coated onto the deposited ITO film and Cu film. Exposing is performed with a first mask. Then developing and etching are performed, and the remaining photoresist is removed to form the common electrode and the gate.

In an exemplary embodiment, the method further comprises forming the second light shielding layer in the light non-transmission region of the first base plate, wherein the second light shielding layer is further from the second substrate than the first light shielding layer. For example, in case the common electrode is made from an opaque material, the second light shielding layer is arranged in a same layer as the common electrode, or is formed from the common electrode.

Then, a first insulating layer is formed on the first base plate resulting from the previous step. The process for the first insulating layer is identical to the existing process. In particular, a layer of silicon nitride (SiN) with a thickness of 3000 Å is deposited on the first base plate resulting from the previous step, by plasma enhanced chemical vapor deposition (PECVD).

Then, a semiconductor active layer, a source, and a drain are formed on the first base plate resulting from the previous step by a second patterning process. The process for the semiconductor active layer, the source, and the drain is identical to the existing process. In particular, an amorphous silicon layer of 1500 Å is deposited on the first base plate resulting from the previous step by PECVD, and molybdenum(Mo), Nd, Cu metal layers are then deposited by magnetron sputtering to a thickness of 150 Å, 150 Å, 1500 Å. Photoresist is coated onto the deposited Mo, Nd, Cu metal layers. Exposing is performed with a second mask. Then developing and etching are performed, and the remaining photoresist is removed to form the semiconductor active layer, the source and the drain.

Then, a second insulating layer is formed on the first base plate resulting from the previous step by a third patterning process. The process for the second insulating layer is identical to the existing process. In particular, a SiN layer with a thickness of 5500 Å is deposited on the first base plate resulting from the previous step by PECVD. Photoresist is coated onto the deposited SiN layer. Exposing is performed with a third mask. Then developing and etching are performed, and the remaining photoresist is removed to form vias which run through the SiN layer.

Then, a pixel electrode is formed on the first base plate resulting from the previous step by a fourth patterning process. The process for the pixel electrode is identical to the existing process. In particular, an ITO film with a thickness of 800 Å is deposited on the first base plate resulting from the previous step by magnetron sputtering. Photoresist is coated onto the deposited ITO film. Exposing is performed with a fourth mask. Then developing and etching are performed, and the remaining photoresist is removed to form the pixel electrode.

Then, an opaque organic resin layer is deposited on the first base plate resulting from the previous step. The opaque organic resin is deposited to a thickness of 1 micrometer (μm)-2 μm. Exposing and developing are performed with a fifth mask, to form the first light shielding layer which is located in the light non-transmission region of the first base plate.

Then, the process on the second base plate will be described below.

Firstly, R, G, B color resists are formed on a second base plate by a patterning process. The process for R, G, B color resists is identical to the existing process, which is not repeated here for simplicity. In particular, the R color resist is formed to a thickness of 2.2 μm, G color resist a thickness of 2.3 μm, and B color resist a thickness of 2.5 μm.

Then, a planarization layer is formed on the second base plate resulting from the previous step. The process for the planarization layer is identical to the existing process, which is not repeated here for simplicity. In particular, the planarization layer is formed to a thickness of 1.5 μm.

Then, a plurality of photo spacers are formed on the second base plate resulting from the previous step by a patterning process. The process for photo spacers is identical to the existing process, which is not repeated here for simplicity. In particular, the photo spacers are formed to a height of 3 μm.

In the specific embodiment of the present disclosure, the color resists, the planarization layer, and the photo spacers are formed on the second base plate. As compared with the case in which most processes are focused on the array substrate, the defects in which the process flow is complicated and difficult with a low yield are overcome.

Furthermore, among the above mentioned processes on the first base plate and the second base plate, the processes other than the process for forming the first light shielding layer, are identical to the existing processes. Thus, there is a small effect on the existing processes for the color film substrate and the array substrate. It is only required to make small modifications to the process and apparatus, so that the current production capacity and apparatus can be made full use of.

Figure 10B:
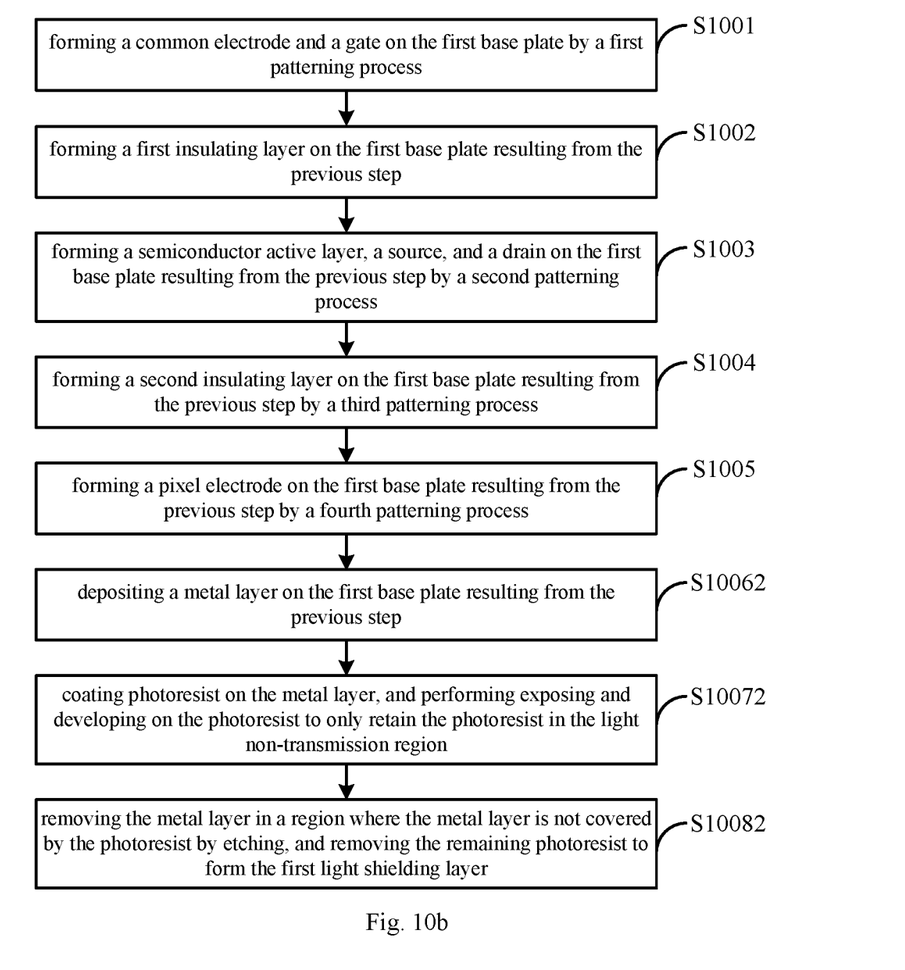

In an embodiment of the present disclosure, as shown in FIG. 10b, the process on a first base plate comprises:

S1001, forming a common electrode and a gate on the first base plate by a first patterning process;

S1002, forming a first insulating layer on the first base plate resulting from the previous step;

S1003, forming a semiconductor active layer, a source, and a drain on the first base plate resulting from the previous step by a second patterning process;

S1004, forming a second insulating layer on the first base plate resulting from the previous step by a third patterning process;

S1005, forming a pixel electrode on the first base plate resulting from the previous step by a fourth patterning process;

S10062, depositing a metal layer on the first base plate resulting from the previous step;

S10072, coating photoresist on the metal layer, and performing exposing and developing on the photoresist to only retain the photoresist in the light non-transmission region; and S10082, removing the metal layer in a region where the metal layer is not covered by the photoresist by etching, and removing the remaining photoresist to form the first light shielding layer.

The process for forming the common electrode, the gate, the first insulating layer, the semiconductor active layer, the source, the drain, the second insulating layer, and the pixel electrode on the first base plate in the present embodiment is identical to the process in the previous embodiments, which is not repeated here for simplicity. Hereinafter, steps S10072, S10082 for forming the first light shielding layer on the first base plate will be described.

As shown in FIG. 10b, a metal layer is deposited on the first base plate on which the pixel electrode has been formed. In particular, a Cu film with a thickness of 1000 Å-5000 Å is deposited by magnetron sputtering on the first base plate on which the pixel electrode has been formed.

Then, photoresist is coated on the Cu film, and photoresist exposing and developing is performed to only retain photoresist in the light non-transmission region. The Cu film which is not covered by photoresist is removed by etching, and the remaining photoresist is removed to form the first light shielding layer.

The process on the second base plate in the present embodiment is identical to the process in the previous embodiments, which is not repeated here for simplicity.

To sum up, specific embodiments of the present disclosure provide a curved display panel, which comprises a first substrate and a second substrate which are arranged oppositely, and a liquid crystal layer which is arranged between the first substrate and the second substrate. The first substrate is the array substrate, is divided into a light transmission region and a light non-transmission region, and comprises a first light shielding layer which is arranged in the light non-transmission region. The second substrate comprises color resists of at least three different colors, and the second substrate is arranged closer to a back light source than the first substrate. The first substrate and the second substrate in an assembled state have an arc-shaped cross section in an extending direction of a side of the second substrate, the arc-shaped cross section has a bending direction opposite to an incident direction of light from the back light source, and the first substrate and the second substrate have a same bending direction. In specific embodiments of the present disclosure, the first light shielding layer is formed in the light non-transmission region of the first substrate, and the partial region corresponds to the disordered region of the display panel. When the assembled planar display panel is bent, there is no relative displacement between the first light shielding layer and the disordered region, which improves light leakage. In addition, light from the back light source irradiates from the second substrate, and the first light shielding layer inhibits color mixing at the periphery pixels.

Apparently, the person with ordinary skill in the art can make various modifications and variations to the present disclosure without departing from the spirit and the scope of the present disclosure. In this way, provided that these modifications and variations of the present disclosure belong to the scopes of the claims of the present disclosure and the equivalent technologies thereof, the present disclosure also intends to encompass these modifications and variations.

What is claimed is:

1. A curved display panel comprising: a first substrate and a second substrate arranged opposite one another, and a liquid crystal layer arranged between the first substrate and the second substrate, wherein the first substrate is an array substrate, the first substrate is divided into a light transmission region and a light non-transmission region, and the first substrate comprises a first light shielding layer arranged in the light non-transmission region;

wherein the second substrate comprises color resists of at least three different colors, and the second substrate is arranged closer to a back light source than the first substrate; and wherein the first substrate and the second substrate in an assembled state have an arc-shaped cross section in an extending direction of a side of the second substrate, the arc-shaped cross section has a bending direction opposite to an incident direction of light from the back light source, and the first substrate and the second substrate have a same bending direction.

2. The curved display panel of claim 1, wherein the first light shielding layer is made from a black matrix, and is arranged on a surface of the first substrate facing the second substrate.

3. The curved display panel of claim 2, wherein the first light shielding layer comprises an opaque material of an organic resin or a metal.

4. The curved display panel of claim 2, wherein the first light shielding layer comprises a Cu layer or Mo/Al/Mo stacked layers.

5. The curved display panel of claim 1, wherein the first substrate further comprises a second light shielding layer arranged in the light non-transmission region, and wherein the second light shielding layer is further from the second substrate than the first light shielding layer.

6. The curved display panel of claim 5, wherein the second light shielding layer is made from an opaque material of the first substrate.

7. The curved display panel of claim 6, wherein the second light shielding layer is arranged in a same layer as a common electrode or is formed from a common electrode.

8. The curved display panel of claim 7, wherein the first substrate comprises a first base plate, as well as the common electrode, a gate, a first insulating layer, a semiconductor active layer, a source, a drain, a second insulating layer, a pixel electrode, and the first light shielding layer which are arranged on the first base plate in this order.

9. The curved display panel of claim 8, further comprising photo spacers arranged between the first substrate and the second substrate, wherein orthographic projections of the photo spacers on the first substrate lie in the light non-transmission region.

10. A curved display device, comprising the curved display panel of claim 1, and a curved back light source, wherein the second substrate is closer to the curved back light source than the first substrate.

11. A method for fabricating a curved display panel comprising:

forming a first light shielding layer on a first base plate by a patterning process, wherein the first base plate is divided into a light transmission region and a light non-transmission region, and the first light shielding layer is formed in the light non-transmission region;

forming color resists of at least three different colors on a second base plate by a patterning process;

assembling the first base plate and the second base plate, and injecting liquid crystal layer between the first base plate and the second base plate; and bending the first base plate and the second base plate in a direction from the second base plate to the first base plate, wherein the first light shielding layer is arranged on a surface of the first substrate facing the second substrate, and wherein forming the first light shielding layer on the first base plate by the patterning process comprises:

depositing an opaque organic resin layer on the first base plate; and performing exposing and developing on the opaque organic resin to form the first light shielding layer in the light non-transmission region of the first base plate.

12. The method of claim 11, wherein the first light shielding layer is made from a black matrix.

13. The method of claim 12, wherein forming the first light shielding layer on the first base plate by the patterning process comprises:
- depositing a metal layer on the first base plate;
- coating photoresist on the metal layer, and performing exposing and developing on the photoresist, to only retain the photoresist in the light non-transmission region; and
- removing the metal layer in a region where the metal layer is not covered by the photoresist by etching, and remove the remaining photoresist to form the first light shielding layer.

14. The method of claim 11, further comprising forming a second light shielding layer in the light non-transmission region of the first base plate, wherein the second light shielding layer is arranged further from the second substrate than the first light shielding layer.

15. The method of claim 14, wherein prior to forming the first light shielding layer on the first base plate by the patterning process, the method comprises:
- forming a gate and a common electrode in the light non-transmission region of the first base plate by a first patterning process, wherein the common electrode is opaque to form the second light shielding layer;
- forming a first insulating layer on the first base plate resulting from the previous step;
- forming a semiconductor active layer, a source, and a drain on the first base plate resulting from the previous step by a second patterning process;
- forming a second insulating layer on the first base plate resulting from the previous step by a third patterning process; and
- forming a pixel electrode on the first base plate resulting from the previous step by a fourth patterning process.

16. The method of claim 11, wherein after forming color resists of at least three different colors on the second base plate by the patterning process, the method comprises:
- forming a planarization layer on the second base plate on which color resists of at least three different colors have been formed; and
- forming a plurality of photo spacers on the second base plate resulting from the previous step by a patterning process, wherein the photo spacers are arranged between the first base plate and the second base plate, and orthographic projections of the photo spacers on the first base plate lie in the light non-transmission region.

* * * * *